United States Patent

[11] 3,547,015

[72] Inventor Robert L. Dalton
    Pittsford, N.Y.
[21] Appl. No. 653,808
[22] Filed July 17, 1967
[45] Patented Dec. 15, 1970
[73] Assignee By mesne assignments, to Marine
    Midland Trust Company of Western
    New York,
    Industrial Financing Division, Buffalo, N.Y.

[54] PHOTOGRAPHIC CAMERA
    10 Claims, 7 Drawing Figs.
[52] U.S. Cl. .................................................. 95/1.1;
    355/19, 352/97
[51] Int. Cl. ........................................... G03b 17/24
[50] Field of Search .......................................... 95/1.1;
    352/97; 355/19

[56] References Cited
    UNITED STATES PATENTS

| | | | |
|---|---|---|---|
| 1,336,330 | 4/1920 | Zuckerman | 95/1.1 |
| 1,849,939 | 3/1932 | Lipshitz | 95/1.1 |
| 2,257,676 | 9/1941 | Gance | 95/1.1X |
| 2,362,814 | 11/1944 | Gorey | 95/1.1 |
| 2,896,522 | 7/1959 | Stein | 95/1.1 |
| 2,998,761 | 9/1961 | Cooper | 95/1.1 |
| 3,223,007 | 12/1965 | Craven | 95/1.1 |
| 3,326,102 | 6/1967 | Dalton | 95/1.1 |
| 3,334,561 | 8/1967 | Kondur | 95/1.1 |
| 3,388,649 | 6/1968 | Dietz | 95/1.1X |
| 1,808,743 | 6/1931 | Barkelew | 355/19X |
| 2,148,814 | 2/1939 | Ionesco | 352/97 |
| 2,199,305 | 4/1940 | Dewey | 355/75 |
| 2,263,025 | 11/1941 | Young | 355/76 |
| 2,394,225 | 2/1946 | Ashford | 95/1.1X |
| 2,964,995 | 12/1960 | Tondreau | 352/97X |

Primary Examiner—John M. Horan
Attorney—Philip K. Fitzsimmons & B. Edward Shlesinger, Jr.

ABSTRACT: To use this camera a transparency bearing intelligence identifying the individual, whose picture is to be taken, is slid into the camera into registry with the exposure aperture. A manually operated switch is then tripped to cause the transparency to be pressed into direct contact with the film frame at the exposure aperture. An electric circuit is then closed automatically to open the shutter. At full open position the shutter triggers the flashlamp. Both the image of the individual and the intelligence on the transparency are thus photographed simultaneously on the film frame. A time delay relay then releases the transparency and energizes a motor to advance the film to the next frame.

INVENTOR
ROBERT L. DALTON

BY
ATTORNEY

INVENTOR
ROBERT L. DALTON

BY
ATTORNEY

INVENTOR
ROBERT L. DALTON

PHOTOGRAPHIC CAMERA

This invention relates to cameras for producing pictures for identification cards such as are used by banks, stores, gasoline sales corporations, employers, state motor and gun licensing bureaus, etc.

Heretofore most identification cards have been produced either by gluing or photographing an individual's picture onto a blank identification card, and thereafter typing on the card pertinent descriptive data as to the individual, such as his name, address, account number, etc. Usually this card is signed by the individual after his or her picture has been mounted thereon. In any case, the information added to such a card can be altered by erasure, ink eradication, or the like. Aside from this, the preparation of I.D. cards heretofore has been quite time-consuming, often involving the photographing of the individual at one site, and the preparation of the card itself at another place.

The primary object of this invention is to provide a camera for making I.D. cards that are effectively incapable of alteration.

To this end it is another object of the invention to provide a camera by which an individual and his or her pertinent identifying data may be photographed simultaneously onto a single film frame which itself may constitute the I.D. card, or from which the I.D. card may be printed.

Another object of the invention is to provide a camera of this character which will be small, compact, and readily portable.

Another object of the invention is to provide a camera of the character described which can be operated rapidly so as to permit practical use thereof in making individual I.D. cards successively for large groups of people.

Still another object of the invention is to provide a camera of the character described which, once tripped for the taking of a picture, will complete its cycle of operation automatically through suitable electrical circuits built into the camera.

A still further object of the invention is to provide a camera of the type described which will take roll film so as to permit taking a series of pictures without reloading.

Other objects of the invention will be apparent hereinafter from the specification and from the recital of the appended claims, particularly when read in conjunction with the accompanying drawings.

Figure 1:
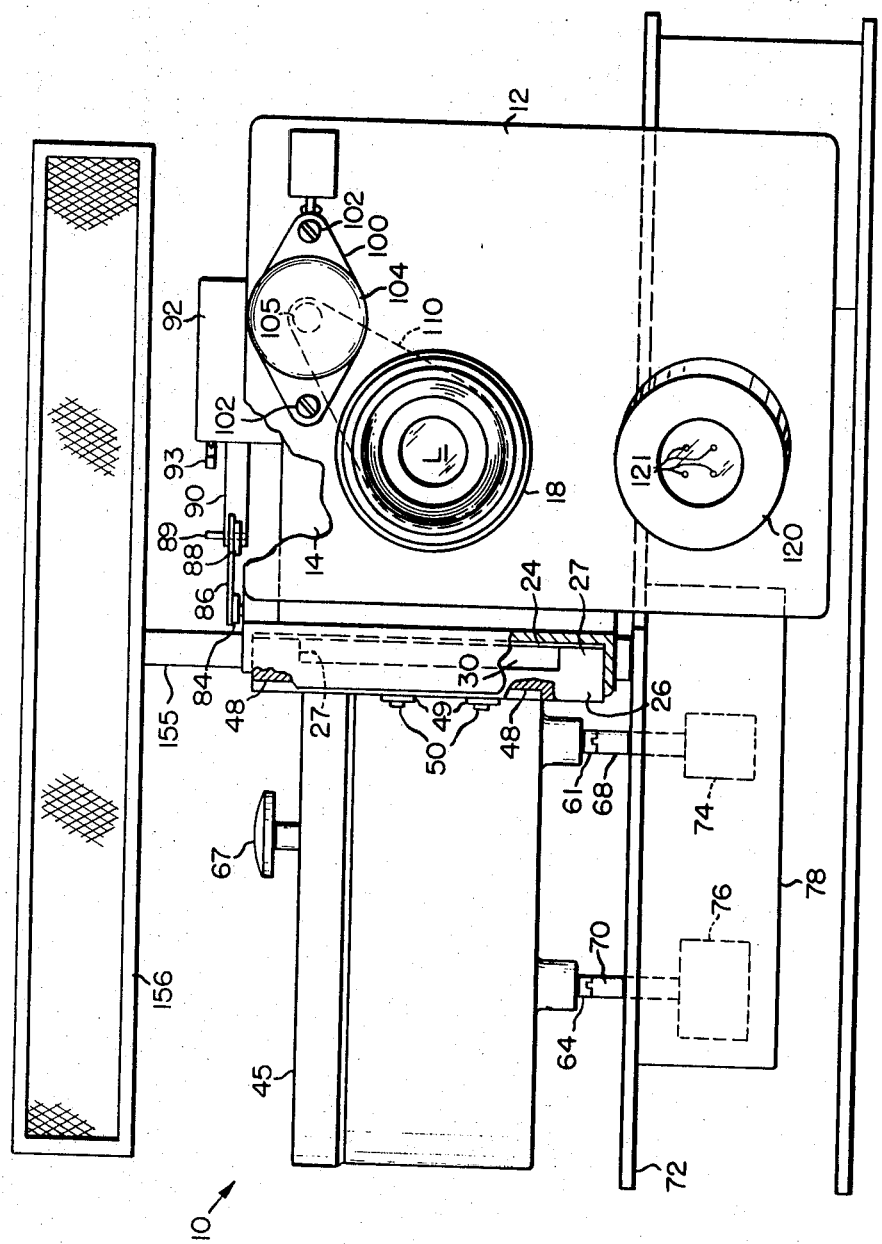
FIG. 1 is a front elevational view of a camera built according to one embodiment of this invention, parts thereof being cut away and shown in section.

Referring now to the drawings by numerals of reference, 10 denotes generally a camera comprising a lens mount or plate 12, which is secured to the front of a housing 14, so that an opening 15 (FIG. 2) in plate 12 registers with an opening 16 in the front of the housing. A conventional lens barrel 18 is mounted on the front of plate 12 so that its lens L registers through openings 15 and 16 with a mirror 20 (FIG. 3), which is mounted in the rear of housing 14 to lie in a plane inclined approximately 45° to the axis of the lens L. Images reflected by the mirror are projected through an opening 21 (FIG. 4) in the side of the housing.

Figure 3:
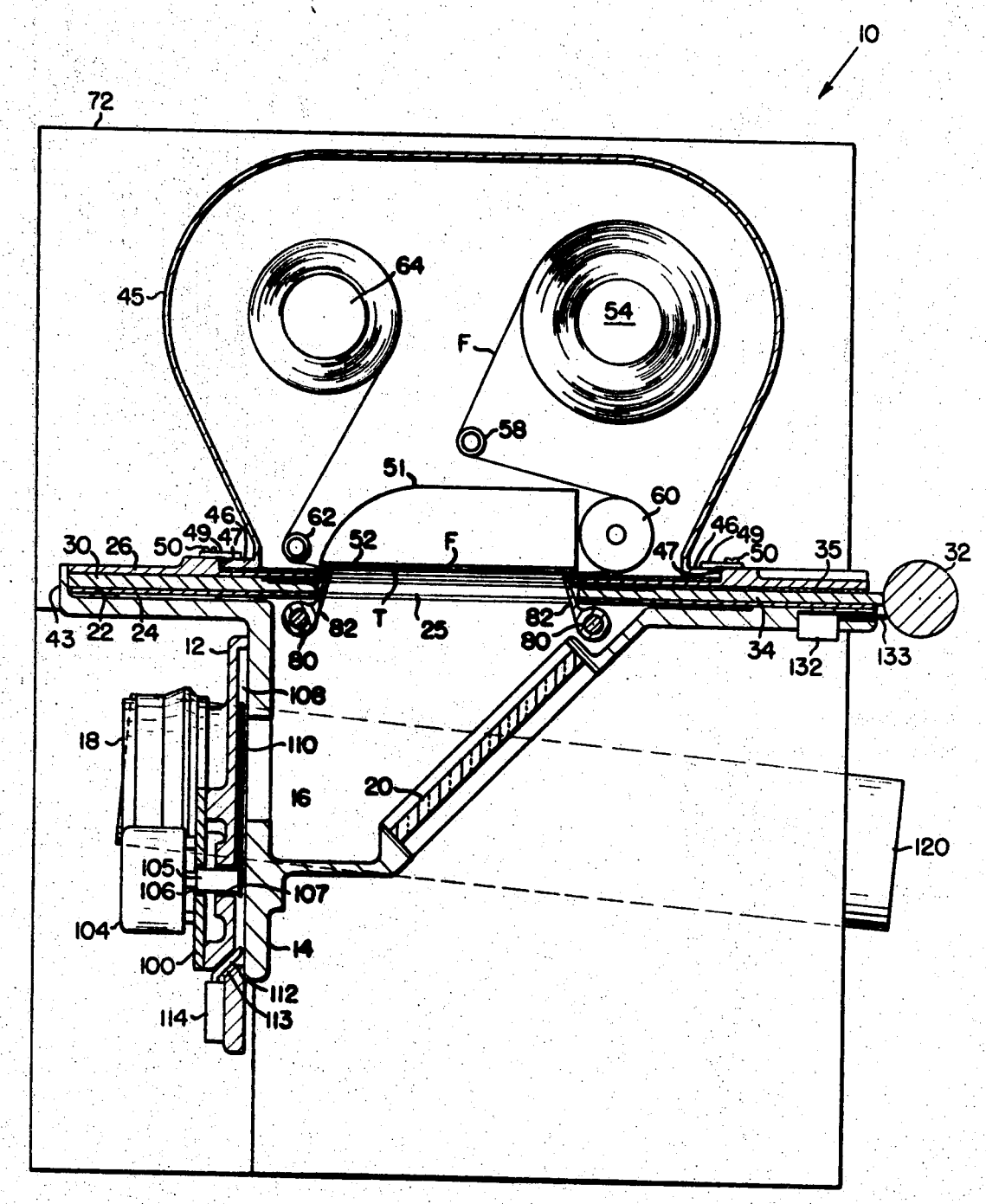
FIG. 3 is a plan view similar to FIG. 2, but with additional parts thereof cut away and shown in section.

Seated on a ridge 22 (FIG. 3) formed on the side of housing 14 in a spacer plate 24 having an aperture 25 therethrough registering with opening 21 of housing 14. Mounted on plate 24 is an elongate, frame member 26 having on one side thereof spaced, parallel ribs or guides 27 (FIG. 1), which rest on plate 24 and form a guide for a slidably removable transparency holder, or format slide 30 (FIG. 3). This slide has at one end a handle 32 by means of which it is insertable into and withdrawable from frame member 26.

Figure 4:
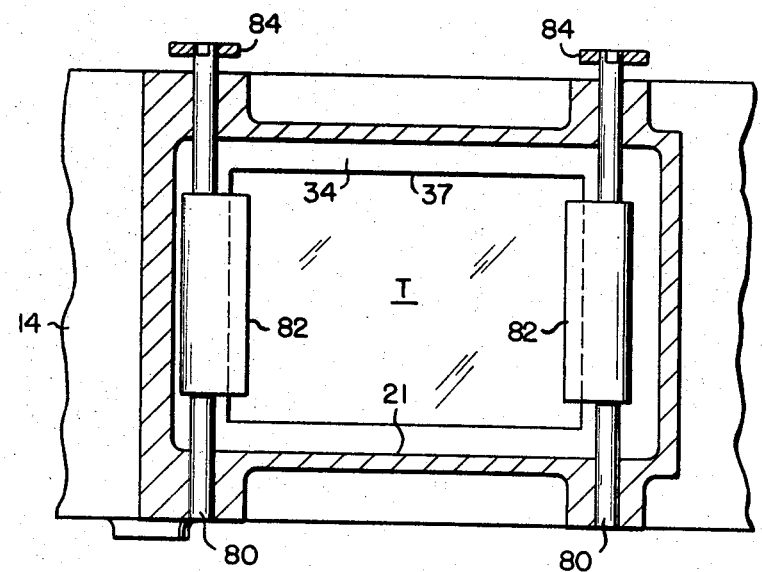
FIG. 4 is a fragmentary sectional view on an enlarged scale showing the exposure aperture and parts of the means for clamping a transparency against the film.
Figure 5:
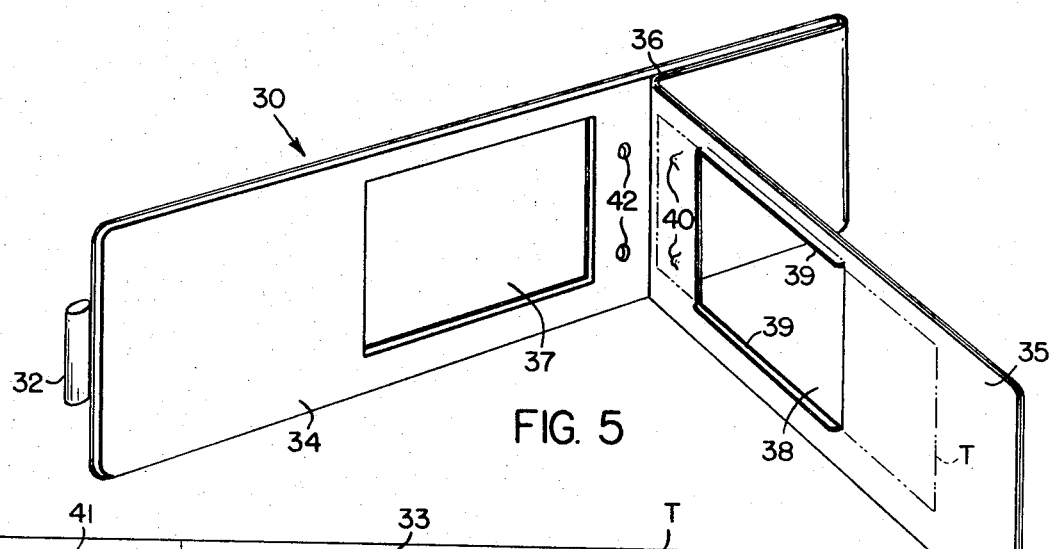
FIG. 5 is a perspective view illustrating one type of transparency holder or slide adapted to be employed within this camera.

As shown in FIG. 5, the format slide 30 comprises an apertured base plate 34 and an apertured cover or door 35 hinged at 36 to base plate 34. The slide 30 is adapted to hold a plastic transparency, one side of which is dull and the other side of which is glossy, and bearing on its nonglossy side informational indicia, such as that shown in FIG. 6, which is such as may be used in making an I.D. credit card issued by a bank. The transparency is adapted to be placed between the base plate 34 and the door 35 with the portion 33 of the transparency, which carries the indicia, registering with the apertures 37 and 38 in base plate and door, respectively. When the slide 30 is pushed home against the flange 43 (FIG. 3) on housing 14 apertures 37 and 38 register with opening 25 in plate 24 and with opening 21 (FIG. 4) in housing 14.

The aperture 38 (FIG. 5) is bounded along its upper and lower edges by ledges 39 which support the transparency T in registry with apertures 37 and 38. Adjacent its inner end, door 35 is provided with two spaced, pointed teeth or tabs 40, which are adapted to punch through the inner end 41 of the transparency T and extend into registering openings 42 in the base 34 of the holder 30, when the loaded door is closed.

Slide 30 is removable only from the back or right side (FIGS. 2 and 3) of the camera.

The film F used with the camera is carried in a removable cartridge or magazine 45, one of which is shown in the drawings. Each cartridge 45 has at opposite sides thereof outwardly projecting feet 46 (FIG. 3), which are adapted to slide between the guide walls 47 of a slot 48 (FIG. 1) formed in the outer face of frame member 26.

The cartridges are removably secured in place by clamps 49, which are fastened to member 26 by screws 50. Cartridge 45 has a rectangular exposure opening (FIG. 3) in its side, which registers with the apertures 21, 37 and 38, when the cartridge is fully seated in the slot 48 and the format slide is in position in the camera.

Rotatably mounted in the cartridge is a supply spool 54 (FIG. 3) which is adapted to hold a roll of film F, which is adapted to be fed from the spool 54 around an idler roller 58, a metering roll 60, across the exposure aperture in the side of the cartridge, beneath the leg 52 of a right-angular pressure plate 51, and around an idler roller 62 to a takeup spool 64. Rollers 58, 60 and 62, and spools 54 and 64 are all suitably journaled in the cartridge. Pressure plate 51 is resilient and may be of conventional construction. It is secured in the cartridge to overlie the opening in the side of the cartridge and to hold a frame of film in the exposure plane of the camera.

Slot 48 is open on the upper side of guide member 26 as shown in FIG. 1, but terminates short of the lower side thereof, so that there is a limit to which the film cartridge 45 may be inserted into the slot 48, and so that by pushing the cartridge to its limit position in the guide member the exposure aperture of the cartridge will be properly located in the camera. At its upper end (FIG. 1) cartridge 45 has a handle 67 for inserting it into, or withdrawing it from, the slot 48. At the lower end of the cartridge shaft 61 of roller 60 and takeup spool 64 project out of the cartridge and are releasably coupled to one end of a cam shaft 68, and to a motor shaft 70, respectively. Shafts 68 and 70 project rotatably through a support plate 72, which is secured to and projects from the side of the housing 14, and are connected, respectively, to a rotatable timer cam 74, and to an electric motor 76, both of which are mounted in a conventional manner in a housing 78 that is secured beneath the plate 72.

Figure 2:
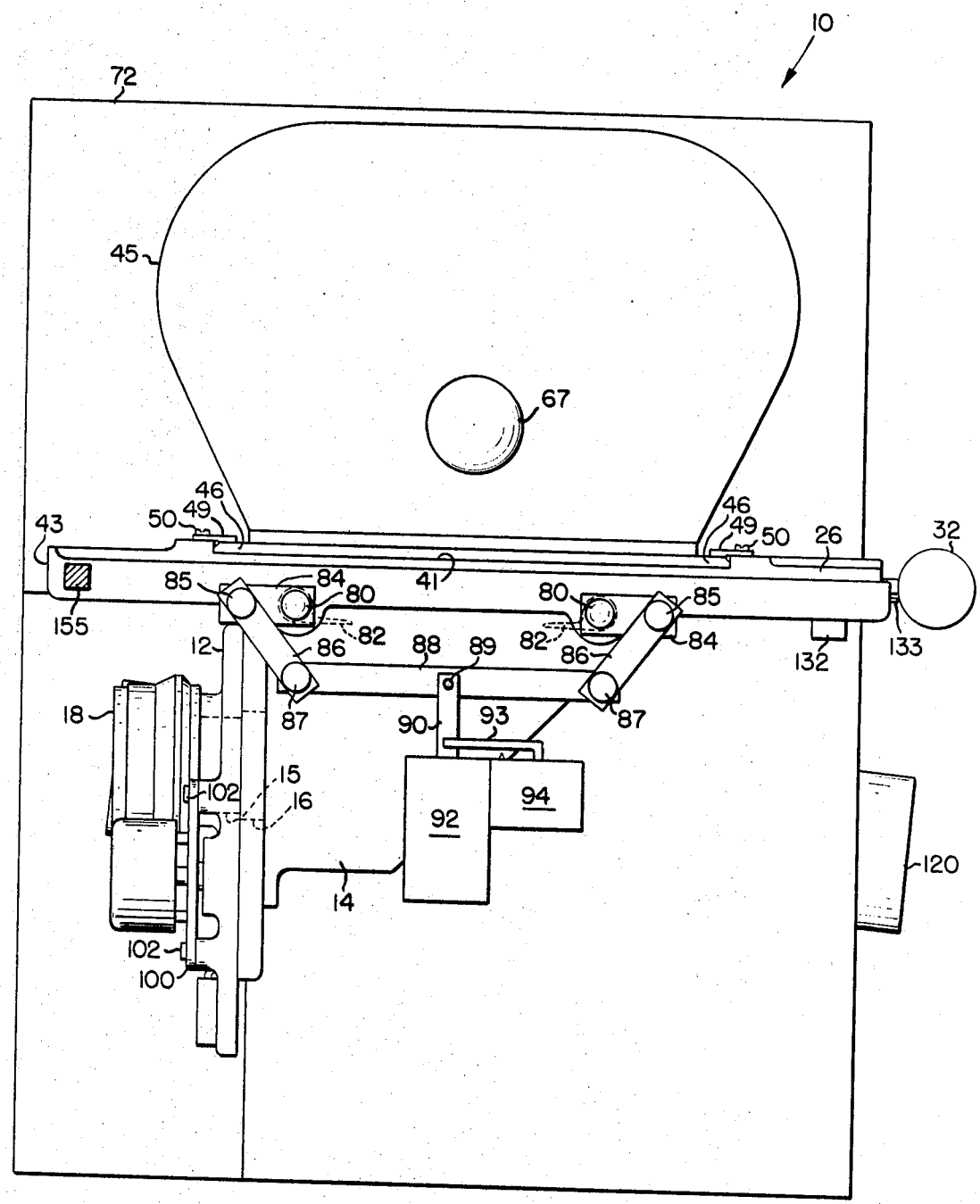
FIG. 2 is a plan view of this camera with its flash attachment cut away.

Rotatably mounted at opposite ends thereof in the side wall of housing 14 to extend transverse to the axis of the lens L adjacent opposite sides, respectively, of the opening 21 are spaced shafts 80 (FIGS. 2 to 4). Secured to each shaft 80 for pivotal movement therewith and into and out of the registering openings 37 and 38 is a finger 82. At one end thereof each shaft 80 is secured to one end of a link 84 (FIG. 2), the opposite end of which is pivotally connected by a pin 85 to a further link 86. The two links 86 are pivotally connected by pins 87 to opposite ends of a toggle arm 88, which is connected by pin 89 to the spring-loaded armature 90 of a conventional solenoid 92, which is secured to the top of housing 14.

When solenoid 92 is energized, its shaft 90 is drawn inwardly against the resistance of a spring (not illustrated) far enough for the arm 88 and links 84 and 86 to pivot the shafts 80 and fingers 82 from their inoperative (broken line) positions (FIG. 2), to their operative (full line) positions (FIG. 3). This movement causes the fingers 82 to swing through the registering opening 37 and 38 of the format holder 30 and against opposite ends of the transparency T in the holder so that the transparency is brought into direct contact with that frame of film F, which is then disposed in front of the pressure plate leg 52.

Pin 89 (FIGS. 1 and 2) projects upwardly from armature 90 so that it will strike the operating arm 93 of a normally open switch 94 (FIG. 2), which is secured to the side of solenoid 92, when the armature 90 is drawn inwardly of the solenoid. Thus, this switch is closed when the transparency has been clamped in direct contact with the film.

When the solenoid 92 is deenergized, its spring returns the shaft 90 outwardly, thereby causing fingers 82 to be swung back to their inoperative positions. This releases the transparency T and also the switch arm 93, so that switch 94 returns to its open position.

Secured to a plate 100, which is removably secured by screws 102 on the face of the mounting plate 12 above and to the right (FIG. 1) of the lens barrel 18, is a conventional rotary solenoid 104. Solenoid 104 has an oscillatable shaft 105 (FIG. 3), which projects rearwardly through registering openings 106 and 107 in the plates 100 and 12, respectively. Secured to the inner end of shaft 105 for oscillation thereby in a space 108 formed between the confronting faces of plate 12 and housing 14 is a shutter blade 110.

When solenoid 104 is deenergized, the shutter 110 is disposed in its normally closed, or broken line, position (FIG. 1), wherein it registers with the opening 16 in housing 14 to prevent the passage of light through the lens L and into the housing 14. When the solenoid 104 is energized, the shutter 110 is pivoted by shaft 105 out of registry with the lens L to permit exposure of the frame of film F then in registry with the openings 37, 38, 25 and 21 and with mirror 20. When the shutter 110 reaches its fully open position under the action of the solenoid 104, it trips the arms 112 (FIG. 3) of a normally open switch 114, which is secured to the face of plate 12 beneath solenoid 104. Arm 112 projects through an opening 113 in plate 12 into the space 108 in which the shutter 110 pivots.

Mounted beneath plate 72 is the housing 120 (FIGS. 1 and 2) of a conventional viewfinder device. Housing 120 projects through plate 12 beneath the lens barrel 18; and one of its lenses has thereon four marks 121 within which the object or person to be photographed is centered.

Mounted in a recess formed in the back of housing 14 beneath the slide 30 is a normally open slide position switch 132 (FIGS. 2 and 3), which has an operating arm 133 that extends through an opening in the back of housing 14 into registry with the handle 32 on the holder 30. When the holder 30 is fully seated beneath member 26 as illustrated in FIG. 3, the handle 32 engages arm 133 to close switch 132.

Mounted on a post 155, which projects up from housing 14 adjacent its forward edge is a conventional flash tube or lamp 156.

Figure 7:
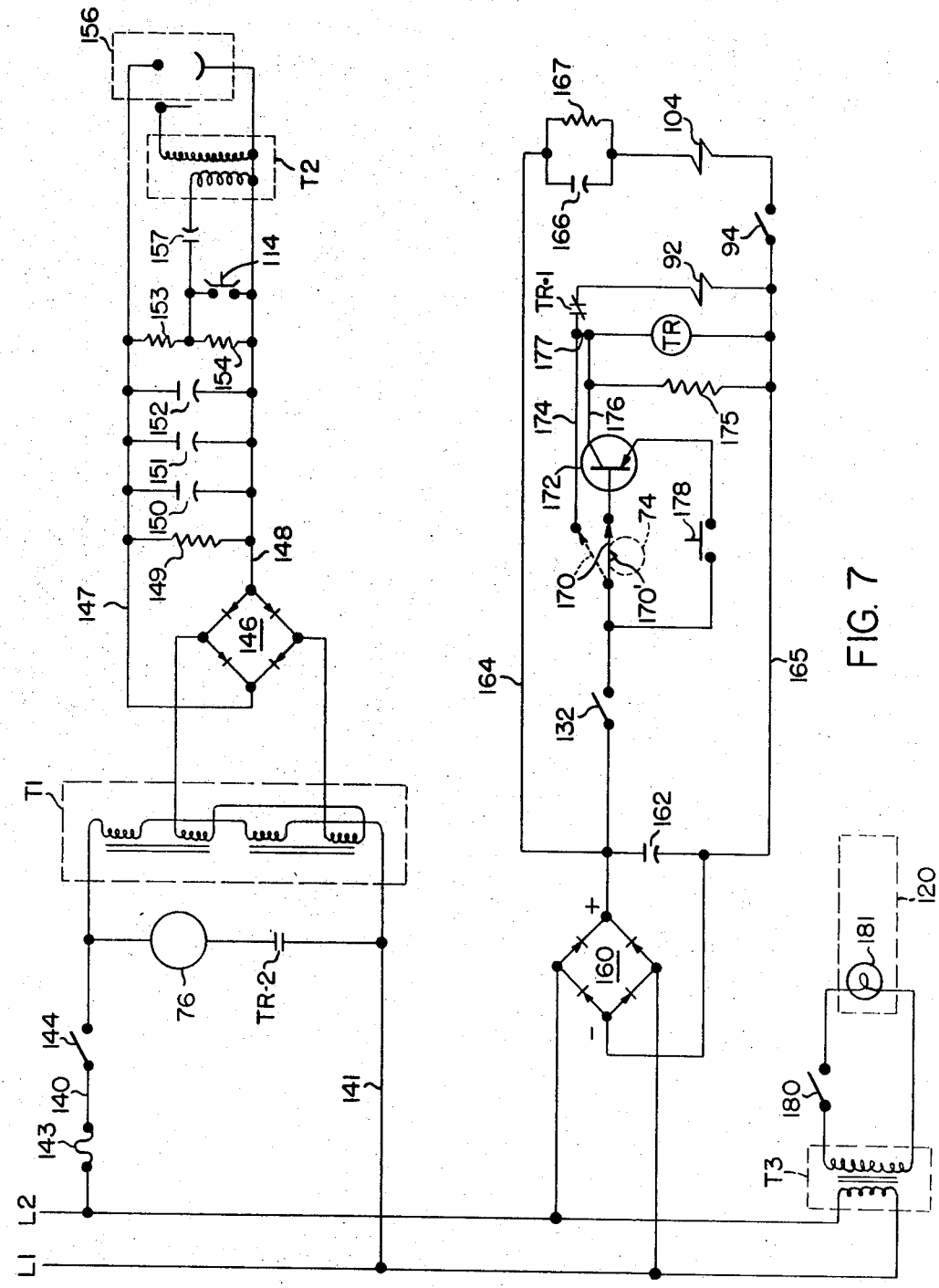
FIG. 7 is a wiring diagram illustrating one manner in which the camera may be wired electrically for operation.

FIG. 7 is a diagram illustrating one manner in which the camera 10 may be wired electrically for operation. L1 and L2 designate the main lines, and are connected by lines 140 and 141 to the primary of a transformer T1. Connected in series with one another, and in parallel with the primary of this transformer across the wires 140 and 141, is the film takeup motor 76, and the normally open, switch arm TR-2 of a time delay relay TR. Line 140 contains a conventional fuse 143, and a normally open, manually operable on-off switch 144, which must be closed to supply power to the motor 76 and to transformer T1. A rectifier 146, which is connected to the secondary of the transformer T1, develops a direct current output voltage across the lines 147 and 148. Connected in parallel across these lines 147 and 148 are a resistor 149, three condensers 150, 151 and 152, a pair of series-connected resistors 153 and 154, and the flash tube 156. Connected in parallel with the resistor 154 is the shutter-operated switch 114, and the primary of a transformer T2. A condenser 157 is connected in series with the primary coil of transformer T2, and the secondary of this transformer is connected to the flash tube 156 to trigger the latter.

Figure 6:
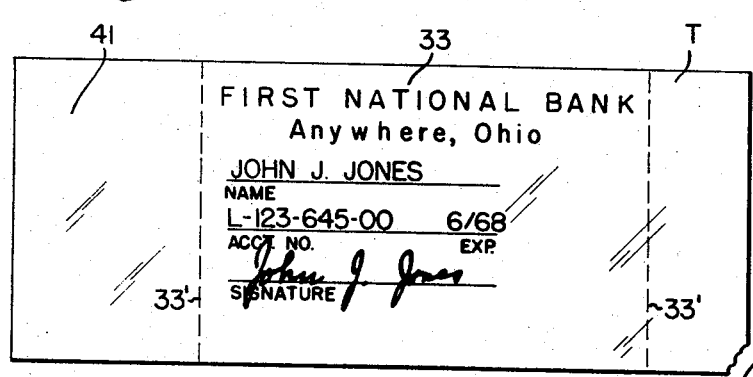
FIG. 6 is a view of a typical transparency usable in the camera.

Lines L1 and L2 are also connected to a second rectifier 160, the output of which is connected across a condenser 162. Connected in parallel with the condenser 162, and in series with one another by the lines 164 and 165, is the switch 94, the rotary solenoid 104, and an RC circuit comprising a condenser 166 and in parallel therewith the resistor 167. One side of condenser 162 (e.g. the positive side as shown in FIG. 6) is connected through the slide position switch 132 and a two-position switch 170 selectively to the base of a transistor 172, or to a line 174. Connected in parallel between line 174 and line 165 are a resistor 175, the time delay relay TR, and the transparency clamping solenoid 92. Solenoid 92 is in series with the normally closed, switch arm TR-1 of time relay TR. The collector of the transistor is connected to line 174 by lines 176 and 177; and its emitter is connected through a spring-loaded, normally open pushbutton 178 to the lead connecting switches 132 and 170.

Lines L1 and L2 also power a further transformer T3, the output of which is connected through a manually operable switch 180 with a lamp 181 in the viewfinder housing 120.

To use the camera, a translucent, plastic transparency T containing the data or intelligence, which is to be recorded on the I.D. card, is mounted in the holder 30 (FIG. 5) so that its dull side bearing the intelligence will face the lens of the camera and its glossy side will face the film. The holder is then inserted in the camera until its handle 32 engages arm 133 (FIG. 2), closing switch 132. At this time the detent or tooth 170' on the switch 170 is engaged in a notch in the metering cam 74 (FIGS. 1 and 7), so that the switch 170 is in its full line position as illustrated in FIG. 7, wherein it is connected to the base of the transistor 172. The transistor 172, which acts as a solid state switch, is normally in a nonconducting state, so that the relay TR and the solenoid 92 normally are deenergized. Also, the normally open switch 94 normally maintains the solenoid 104 deenergized.

When the person to be photographed is in position, the switch 180 is closed to illuminate the viewfinder, and the camera is focused on the person. Then the switch 178, which may be located at any convenient point on the camera, is pushed manually to closed position. Since switch 132 (FIGS. 3 and 7) is now closed by transparency holder 30, the potential across the condenser 162 causes the transistor 172 to be triggered and current flows in the collector circuit 176. This energizes the time relay TR, and through the normally closed, delayed opening switch TR-1 it also energizes the solenoid 92 (FIGS. 2 and 7), so that the fingers 82 (FIGS. 2 and 3) are rotated to press the transparency T firmly against the film frame then registering with the apertures 21, 37 and 38 (FIGS. 1 and 5). When the armature of solenoid 92 reaches its fully retracted position, it engages and closes the switch 94 (FIGS. 2 and 7), which causes the rotary solenoid 104 (FIGS. 1 and 7) to be energized momentarily by the discharge therethrough of the RC circuit 166, 167. This moves the shutter momentarily out of registry with the lens L so that light and the image of the person being photographed falls on the mirror 20 (FIG. 3)

and thence is reflected thereby through the transparency T and onto the film F.

When the shutter 110 (FIGS. 1 and 3) reaches its fully open position, it closes the switch 114 (FIG. 7), which causes a surge of power through the primary of the transformer T2. In response to this sudden surge of voltage, the secondary of this transformer T2 triggers the flash lamp 156 and causes it to discharge, creating a brilliant flash in the lamp housing while the shutter is still in its open position. This exposes the film to both the intelligence on the transparency T, and the image of the person being photographed. Thus, a picture is reproduced on the film of the intelligence on transparency T and of the person to whom that intelligence applies.

After the exposure, the time delay relay TR reverses its switch contacts TR-1 and TR-2, so that TR-1 now opens to deenergize the clamping solenoid 92 (FIGS. 1 and 7) and TR-2 now closes to energize the motor 76. Hence, the exposed frame of the film is moved out of registry with the exposure opening of the camera, and is wound up on the takeup spool 64 (FIG. 3). As the film advances, it rotates the metering roll 60 (FIG. 3), which in turn rotates the cam 74 (FIGS. 1 and 7). As the cam 74 rotates it forces the detent 170' out of the notch in its periphery so that switch 170 is swung from its solid to its broken line position in FIG. 7, thereby connecting the positive side of the condenser 162 (FIG. 7) to the line 174. This removes power from the base of the transistor 172, so that the latter stops conducting, but the relay TR nevertheless remains energized through line 174. As a consequence the motor 76 (FIG. 1) continues to rotate until the cam 74 has made one complete revolution, to bring a new, unexposed frame of film into registry with the exposure apertures of the camera.

After a single revolution of cam 74, the detent 170' on switch 170 once again drops back into the recess in cam 74, so that switch 170 returns to its solid line position in FIG. 7. This deenergizes relay TR, since the transistor 172 is now in its "off" state, and the switches TR-1 and TR-2 return to the positions illustrated in FIG. 7.

To take another photograph the switch 178 again is pushed closed.

It will be appreciated that when the solenoid 92 is deenergized by the opening of the switch TR-1, the spring of solenoid 92 returns it armature to its upper position as illustrated in FIG. 1, so that the fingers that had been holding the transparency against the film F, are swung back to their inoperative or broken line positions. This movement also releases switch 94, which opens to prevent energization of solenoid 104 until the next time switch 94 is closed in the automatic cycle of operation of the camera.

From the preceding description it will be seen that with the camera described simultaneously both the picture of a person and of his or her identifying data are photographed on a frame of film. This absolutely prevents alteration of the resulting I.D. card. The frame of film may itself be used as the I.D. card, preferably being mounted on a clear plastic backing or sandwiched in a clear plastic mounting, or a print can be made of the film frame and this print, mounted on clear plastic or not, as desired, may constitute the I.D. card. Thus drivers' licenses, credit cards, employee I.D. cards, etc. can be made up quickly and cheaply and without fear of alteration.

The portion 33 of the transparency shown in FIG. 6 bounded by the dash lines 33' is what will be photographed onto the film. A frame of the film may be of the same size as the space between these dash lines, and the identification card may also be of this size. The photograph of the individual identified by the intelligence on the transparency may appear in the lower right hand portion of the parts of the film frame and of the identification card, respectively, which correspond to this lower right hand portion of the space 33 on the transparency, or the individual's photograph may extend over part or all of the intelligence photographed on the film frame and appearing on the I.D. card. The position of the individual's photograph on the film frame and on the I.D. card is determined by the position of the apertures in the camera and in the transparency holder and by the location of the camera lens. Thus, the individual can be photographed on the I.D. card so that his picture will extend over part or all of this identifying data, as desired.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:
1. A camera for making identification cards containing a photograph of an individual and data identifying that individual, comprising:
 a housing;
 a lens mounted in said housing at the front thereof for admitting light from the outside into said housing;
 means for holding photosensitive material in registry with an exposure aperture formed inside said housing;
 a shutter movably mounted in said housing between said lens and the exposure aperture;
 a holder for a transparency, which has identifying data on it identifying an individual, movable into and out of said housing between said shutter and the exposure aperture and having an opening which registers optically with said aperture and said lens when said holder is in said housing; and
 clamping means in said housing movable through said opening and said aperture to engage and clamp the transparency, when said holder is in the housing, resiliently in direct contact with the photosensitive material, whereby, when said shutter is tripped, photographs of the individual and of said transparency are made simultaneously on the photosensitive material which is in the exposure aperture.

2. A camera as defined in claim 1, including:
 means for moving said clamping means to operative position; and
 means operative, when said clamping means reaches operative position, to actuate said shutter to move it to its open position.

3. A camera as defined in claim 2 having flash means adapted to be tripped automatically for illuminating said external subject, when said shutter is moved to its open position.

4. A camera as defined in claim 2, including means for preventing movement of said clamping means to its operative position, when said holder is not fully in said housing.

5. A camera as defined in claim 2, wherein:
 the means for moving said clamping means comprises a first solenoid;
 the means for moving said shutter comprises a second solenoid; and
 electric circuit means are provided for successively actuating said first and second solenoids, and for maintaining said first solenoid energized while said second solenoid is energized.

6. A camera as defined in claim 5, wherein said circuit means comprises:
 first switch means operable manually to energize said first solenoid;
 second switch means operative, when said clamping means is moved to its operative position, to actuate said second solenoid; and
 third switch means operative a predetermined time thereafter to deenergize said solenoids and to actuate said material advancing means long enough to advance said new, unexposed portion of said material into registry with said member.

7. A camera for making identification cards containing a photograph of an individual and data identifying that individual, comprising:
- a housing having therein an exposure aperture;
- means for intermittently advancing unexposed film from a supply source past said aperture;
- an objective lens on said housing for projecting the image of a subject external of said housing onto the portion of said unexposed film registering with said aperture;
- means for removably positioning a transparency, which has intelligence thereon, in registry with said aperture and between said lens and said film;
- a shutter movable in said housing between said lens and said positioning means and from a normally closed position, in which it prevents exposure of the portion of film registering with said aperture, and an open position, in which it exposes said portion simultaneously to said image and to the intelligence on said transparency; and
- cyclic control means operable to effect successively movement of said shutter to its open position and operation of said advancing means;
- said positioning means comprising;
  - a holder for said transparency removably slidable into said housing and supporting said transparency;
  - a pair of clamps in said housing movable into and out of a clamping position in which said clamps press the transparency into direct contact with the portion of the film at said exposure aperture; and
  - means for moving said clamps into clamping position before movement of said shutter to its open position.

8. A camera as defined in claim 7, wherein said control means includes:
- first switch means operable manually to initate a cycle in which said clamps are moved to their operative positions before said shutter is opened;
- second switch means adapted to be closed automatically when said clamps are in operative position to open said shutter;
- third switch means operative a predetermined time after opening of said shutter to release said clamps and actuate said advancing means; and
- film metering means operative to stop said advancing means after said film has been advanced a predetermined amount.

9. A camera as defined in claim 8, wherein:
- said advancing means comprises an electric motor;
- a rotatable cam is mounted on said housing;
- said film supply source comprises a magazine removably mountable on said housing and having an exposure aperture for registry with the first-named aperture, and which contains a rotatable takeup shaft adapted to be detachably coupled to the armature of said motor, and a rotatable supply shaft for holding a roll of film;
- said metering means comprises a third shaft rotatably mounted in said magazine and detachably couplable to said cam and rotatable, during advance of said film, to effect rotation of said cam; and
- a switch is positioned to be moved by said cam to close a holding circuit for said motor, when rotation of the latter commences with the advance of said film, and to open said holding circuit, when said cam has completed one revolution.

10. A camera for making identification cards containing a photograph of an individual and data identifying that individual, said camera having:
- an exposure aperture;
- means for holding photosensitive material in registry with said exposure aperture;
- a lens in the front of the camera for letting light from outside the camera into said aperture and to the photosensitive material, to photograph an individual onto the photosensitive material;
- a holder for removably holding a transparency, which has identifying data identifying the individual on its front side, in front of said photosensitive material and so that the rear side of said transparency is in direct contact with an unexposed portion of said photosensitive material and so that said front side of said transparency faces said lens;
- said holder having an opening therethrough which registers optically with said aperture and with said lens and in which said transparency is mounted;
- a shutter disposed in front of said photosensitive material and said holder and between said lens and said holder and movable between open and closed positions and operative, when open, to admit the light passing through said lens to the photosensitive material to photograph an image of the individual and said identifying data simultaneously onto the unexposed portion of said photosensitive material; and
- means for pressing the transparency resiliently into direct contact with the unexposed front portion of said photosensitive material.